(12) United States Patent
Kagoshima et al.

(10) Patent No.: US 7,525,206 B2
(45) Date of Patent: Apr. 28, 2009

(54) POWER SOURCE DEVICE FOR WORKING MACHINE

(75) Inventors: Masayuki Kagoshima, Kobe-shi (JP); Toshio Sora, Kobe-shi (JP); Masayuki Komiyama, Kobe-shi (JP)

(73) Assignees: Kobelco Construction Machinery Co., Ltd., Hiroshima-shi (JP); Kobe Steel Ltd., Kobe-shi (JP)

( * ) Notice: Subject to any disclaimer, the term of this patent is extended or adjusted under 35 U.S.C. 154(b) by 393 days.

(21) Appl. No.: 10/588,704

(22) PCT Filed: Jan. 11, 2005

(86) PCT No.: PCT/JP2005/000183

§ 371 (c)(1),
(2), (4) Date: Aug. 8, 2006

(87) PCT Pub. No.: WO2005/081393

PCT Pub. Date: Sep. 1, 2005

(65) Prior Publication Data

US 2007/0187180 A1 Aug. 16, 2007

(30) Foreign Application Priority Data

Feb. 23, 2004 (JP) ............................. 2004-046832

(51) Int. Cl.
*H02J 11/00* (2006.01)
*B60K 1/00* (2006.01)
(52) U.S. Cl. .................... 290/40 C; 290/7; 180/65.2
(58) Field of Classification Search ............. 290/4 C, 290/4 R, 40 C, 40 B; 180/65.2, 65.4, 312
See application file for complete search history.

(56) References Cited

U.S. PATENT DOCUMENTS

| 6,018,198 | A  | * | 1/2000 | Tsuzuki et al. ................. 290/17 |
| 6,276,472 | B1 | * | 8/2001 | Takashima et al. ......... 180/65.2 |
| 6,678,972 | B2 | * | 1/2004 | Naruse et al. ................. 37/466 |
| 6,708,787 | B2 | * | 3/2004 | Naruse et al. .............. 180/53.8 |

(Continued)

FOREIGN PATENT DOCUMENTS

JP          10 42587         2/1998

(Continued)

*Primary Examiner*—Nicholas Ponomarenko
(74) *Attorney, Agent, or Firm*—Oblon, Spivak, McClelland, Maier & Neustadt, P.C.

(57) ABSTRACT

Power distribution of an engine and an electric power storage device is determined according to a charge amount of the power storage device, and the charge amount of the power storage device is maintained in an adequate range. A power source device for working machines includes a hydraulic pump, a generator-motor, an engine, serving as a common power source, to which the hydraulic pump and the generator-motor are connected parallel, and a battery, serving as an electric power storage device, for storing a power thereof by the generator function of the generator-motor. The generator-motor is driven by a discharge power of the battery to perform the motor function. Using a controller, the power distribution of the engine and the generator-motor is determined based on the required actuator power, the charge power and the discharge power of the battery which are set according to the battery charge amount in such a way that the battery charge amount is maintained in a predetermined range, and on the preset engine power.

5 Claims, 11 Drawing Sheets

U.S. PATENT DOCUMENTS

| | | | |
|---|---|---|---|
| 6,958,549 B2 * | 10/2005 | Wakitani et al. | 290/40 C |
| 7,143,859 B2 * | 12/2006 | Ohtsukasa | 180/307 |
| 7,278,503 B1 * | 10/2007 | Kato et al. | 180/65.4 |
| 7,279,801 B2 * | 10/2007 | Kagoshima | 290/40 C |

FOREIGN PATENT DOCUMENTS

| | | |
|---|---|---|
| JP | 2000 226183 | 8/2000 |
| JP | 2001 268714 | 9/2001 |
| JP | 2002 242234 | 8/2002 |
| JP | 2002-359935 | 12/2002 |
| JP | 2003 087901 | 3/2003 |
| JP | 2003-328397 | 11/2003 |
| JP | 2004 011256 | 1/2004 |
| JP | 2004 056962 | 2/2004 |

* cited by examiner

POWER SOURCE DEVICE FOR WORKING MACHINE

TECHNICAL FIELD

The present invention relates to a power source device for a hybrid working machine using an engine power and an electric power.

BACKGROUND ART

There is well known a hybrid working machine e.g. a power shovel using a parallel driving system (see Japanese Unexamined Patent Publication No. 10-42587)

In the parallel driving system, a hydraulic pump, and a power machine functioning as a generator and an electric motor are connected in parallel to an engine serving as a common power source. The hydraulic pump drives a hydraulic actuator, while the power machine functions as a generator to store power in a power storage device. Also, the power discharged from the power storage device, when needed, allows the power machine to function as a motor for assistance of the engine.

As the power machine, there may be used a single machine which functions both as a generator and an electric motor, or individual machines, one of which is a generator and the other is an electric motor.

The hybrid working machines enable to reduce a load of the engine and to drive the engine in a high performance range so as to realize energy-saving.

DISCLOSURE OF THE INVENTION

The conventional art has the following drawbacks.

Charge and discharge characteristics of an electric power storage device including a battery (secondary cell) such as a lithium ion cell, and a capacitor (electric dual layer capacitor) depend on the charge amount of the power storage device. A reduced charge amount of the power storage device increases its maximum chargeable power and decreases its maximum dischargeable power.

According to the conventional art, power distribution of the engine and the power storage device is determined irrespective of the charge amount of the power storage device. This may cause, under a certain load condition, an excessively small power generation, or an excessively large power generation over the performance of the power storage device.

The result may obstruct effective use of the performance of the power storage device, and degrade the power storage device.

In view of the above, an object of the invention is to provide a power source device, for a working machine, capable of determining power distribution of an engine and a power machine in accordance with a charge amount of a power storage device to maintain the charge amount of the power storage device in an adequate range.

The invention is directed to the following arrangement to solve the above drawbacks.

Specifically, the invention is directed to a power source device, for working machines, comprising a hydraulic pump for driving a hydraulic actuator; a power machine functioning as a generator and an electric motor; an engine which serves as a common power source of the hydraulic pump and the power machine, the hydraulic pump and the power machine being connected in parallel to the engine; and an electric power storage device for storing a power thereof by the generator function of the power machine, the power machine being driven by a discharge power of the power storage device to perform the motor function, and the power source device further comprises:

(A) required actuator power detecting means for detecting a power required by the hydraulic actuator;

(B) charge amount detecting means for detecting a charge amount of the power storage device;

(C) power storage device power setting means for setting a charge power and the discharge power of the power storage device in accordance with a change in the charge amount of the power storage device so as to maintain the charge amount of the power storage device in a predetermined range;

(D) engine power setting means for setting a power of the engine in accordance with the charge amount of the power storage device;

(E) power distributing means for determining power distribution between the engine and the power machine based on the required actuator power, the charge power and the discharge power of the power storage device set by the power storage device power setting means, and the power of the engine set by the engine power setting means; and (F) power machine controlling means for controlling the power of the power machine based on the power distribution determined by the power distributing means.

According to the invention, the charge power and the discharge power of the power storage device, and the power of the engine are set in accordance with the charge amount of the power storage device. Specifically, as the charge amount reduces, the charge power is increased, and the discharge power is decreased, while the engine power is increased. Then, the power distribution between the engine and the power machine is performed based on the charge power, the discharge power, the engine power, and the required actuator power. This allows for maintaining the charge amount of the power storage device in a predetermined range, i.e. a range capable of securing effective use of the performance of the power storage device, and preventing the power storage device from excessive charging and excessive discharging to suppress degradation of the power storage device.

BEST MODE FOR CARRYING OUT THE INVENTION

FIRST EMBODIMENT (See FIGS. 1 through 9)

The first embodiment shows a case using a battery as an electric power storage device i.e. a secondary cell such as a lithium ion cell.

Figure 1:
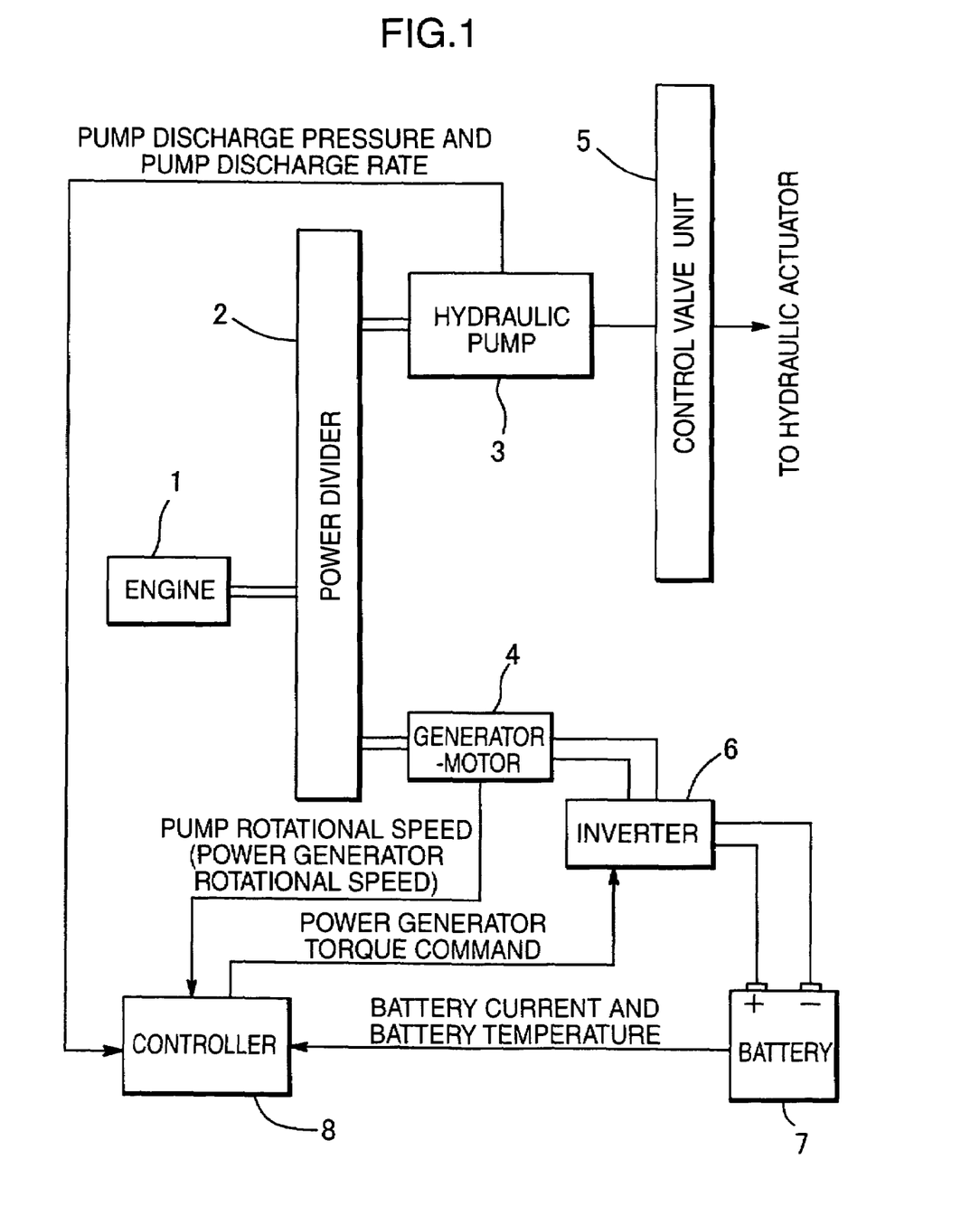
FIG. 1 is a system configuration diagram showing a first embodiment of the invention.

As shown in FIG. 1, a hydraulic pump 3, and a generator-motor 4 which is a power machine functioning as a generator and an electric motor, is connected in parallel to a engine 1 via a power divider 2 to be driven by the engine 1.

The hydraulic pump 3 is connected to unillustrated hydraulic actuators (e.g. in a power shovel, respective cylinders for a boom, an arm, and a bucket; a hydraulic motor for running) via control valves 5, which are hereinafter collectively shown although the control values are individually provided for the respective actuators. The hydraulic actuators are driven by hydraulic oil supplied from the hydraulic pump 3. FIG. 1 shows a case where the single hydraulic pump 3 is connected to the engine 1, but there may be another case where plural hydraulic pumps are connected to the engine 1 in series or parallel.

The generator-motor 4 is connected to a battery 7 as a power storage device via an inverter 6 as power machine controlling means.

The inverter 6 switches over the generator-motor 4 between the generator function and the motor function, controls a power of the generator-motor 4 as a generator, a current or a torque of the generator-motor 4 as a motor, and controls charging and discharging of the battery 7 in accordance with an output of the generator-motor 4 as the generator.

The following information is inputted to a controller 8.

i. a current of the battery 7 to be detected by an unillustrated current sensor. The amount of a power stored in the battery i.e. a battery charge amount is calculated by integration of the current.

ii. a temperature of the battery 7 to be detected by an unillustrated battery temperature sensor.

iii. a pressure (discharge pressure) of the hydraulic pump 3, a discharge rate of the hydraulic pump 3, and a rotational speed of the hydraulic pump 3 (in this case, a rotational speed of the generator-motor 4), which are parameters for obtaining a required actuator power.

Figure 2:
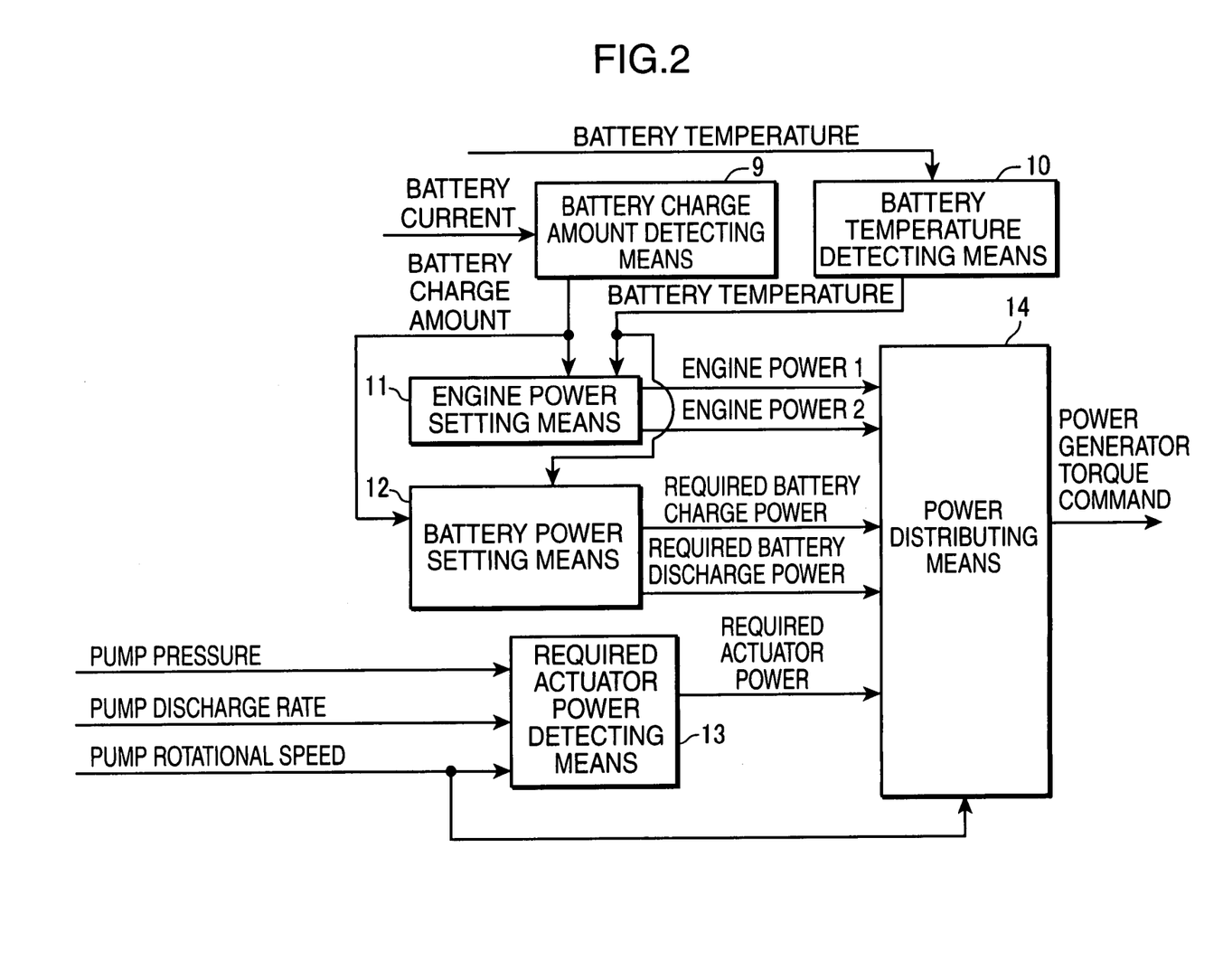
FIG. 2 is a block diagram showing a configuration of a controller in FIG. 1.

A configuration of the controller 8 is described in details referring to FIG. 2.

The controller 8 includes: battery charge amount detecting means 9 for detecting a charge amount of the battery based on the detected battery current; battery temperature detecting means 10 for detecting a temperature of the battery; engine power setting means 11 for setting a power of the engine 1 in accordance with the detected battery charge amount and the detected battery temperature; battery power setting means 12 for setting a power (required charge power and required discharge power) of the battery 7 in accordance with the detected battery charge amount and the detected battery temperature; required actuator power detecting means 13 for detecting a power required by the actuator based on the discharge pressure, the discharge rate, and the rotational speed of the pump; and power distributing means 14 for determining power distribution between the engine 1 and the battery 7.

Figure 3:
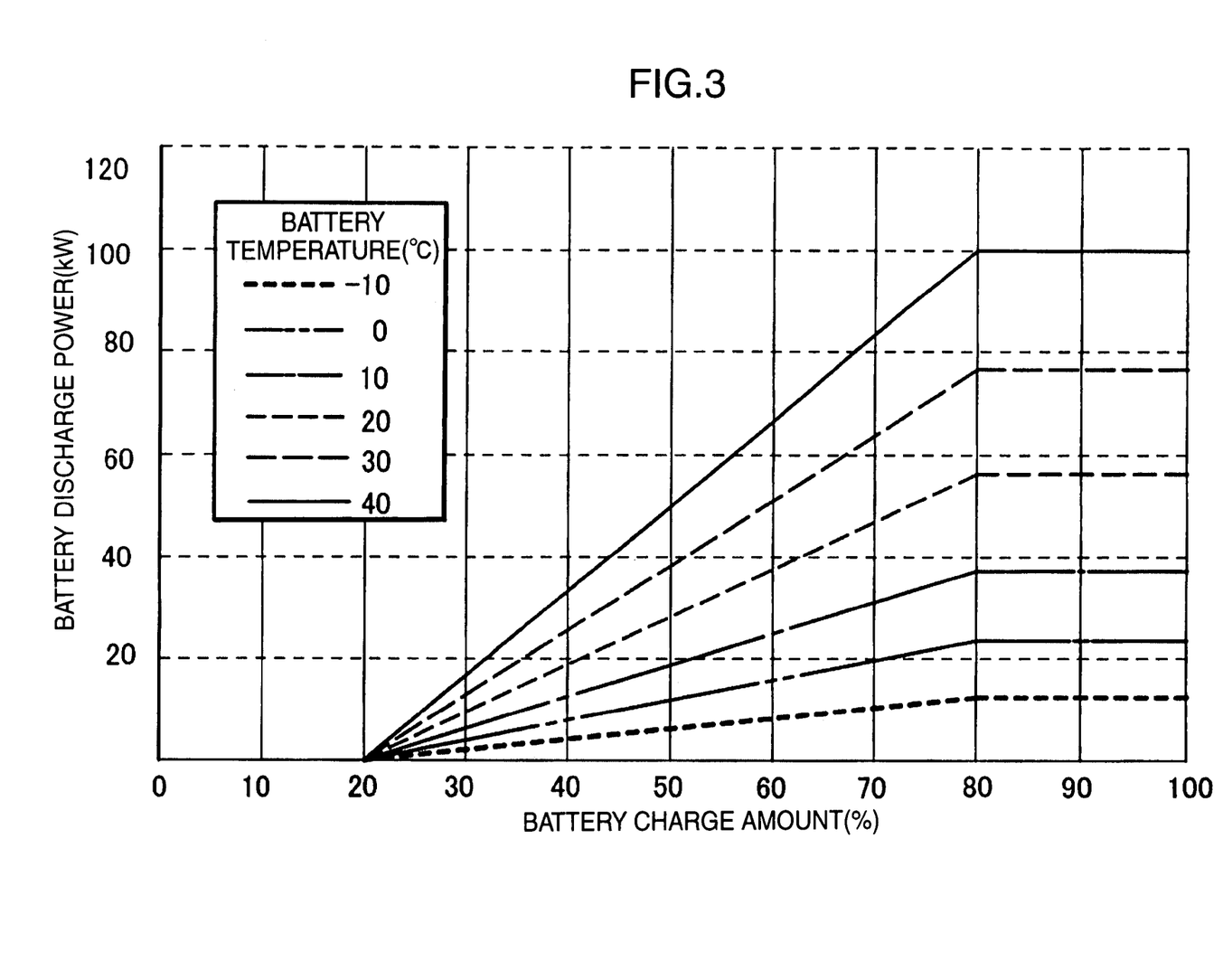
FIG. 3 is a graph showing discharge power characteristics concerning battery charge amount versus temperature.
Figure 4:
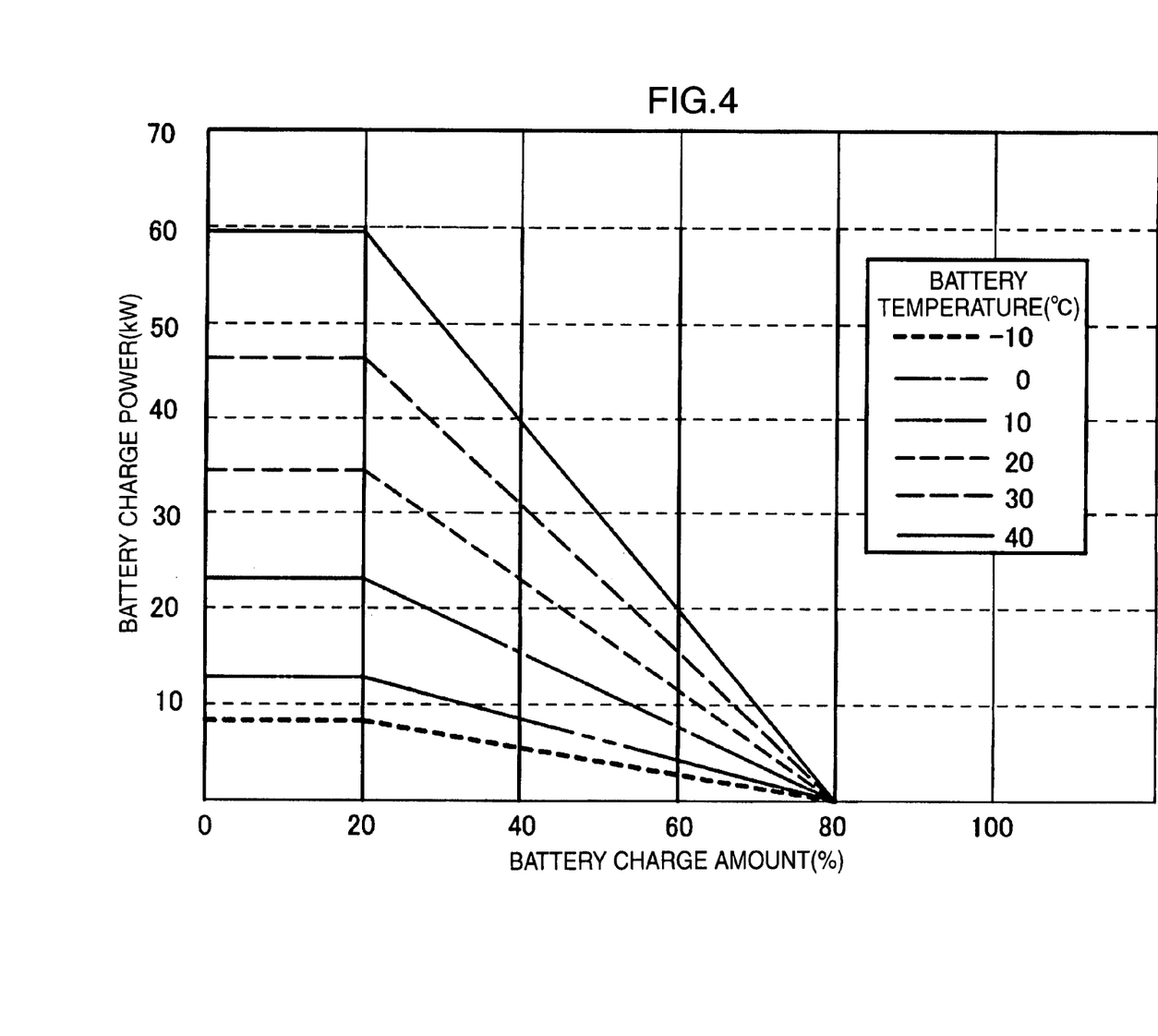
FIG. 4 is a graph showing charge power characteristics concerning battery charge amount versus temperature.

The battery power setting means 12 predefines, as shown in FIGS. 3 and 4, the required charge power and the required discharge power corresponding to the battery charge amount in terms of state of charge (SOC) and the battery temperature in the form of a table; and selects the numerical values of the required charge power and the required discharge power corresponding to the detected battery charge amount and the detected battery temperature in the table, and sets the values.

Figure 5:
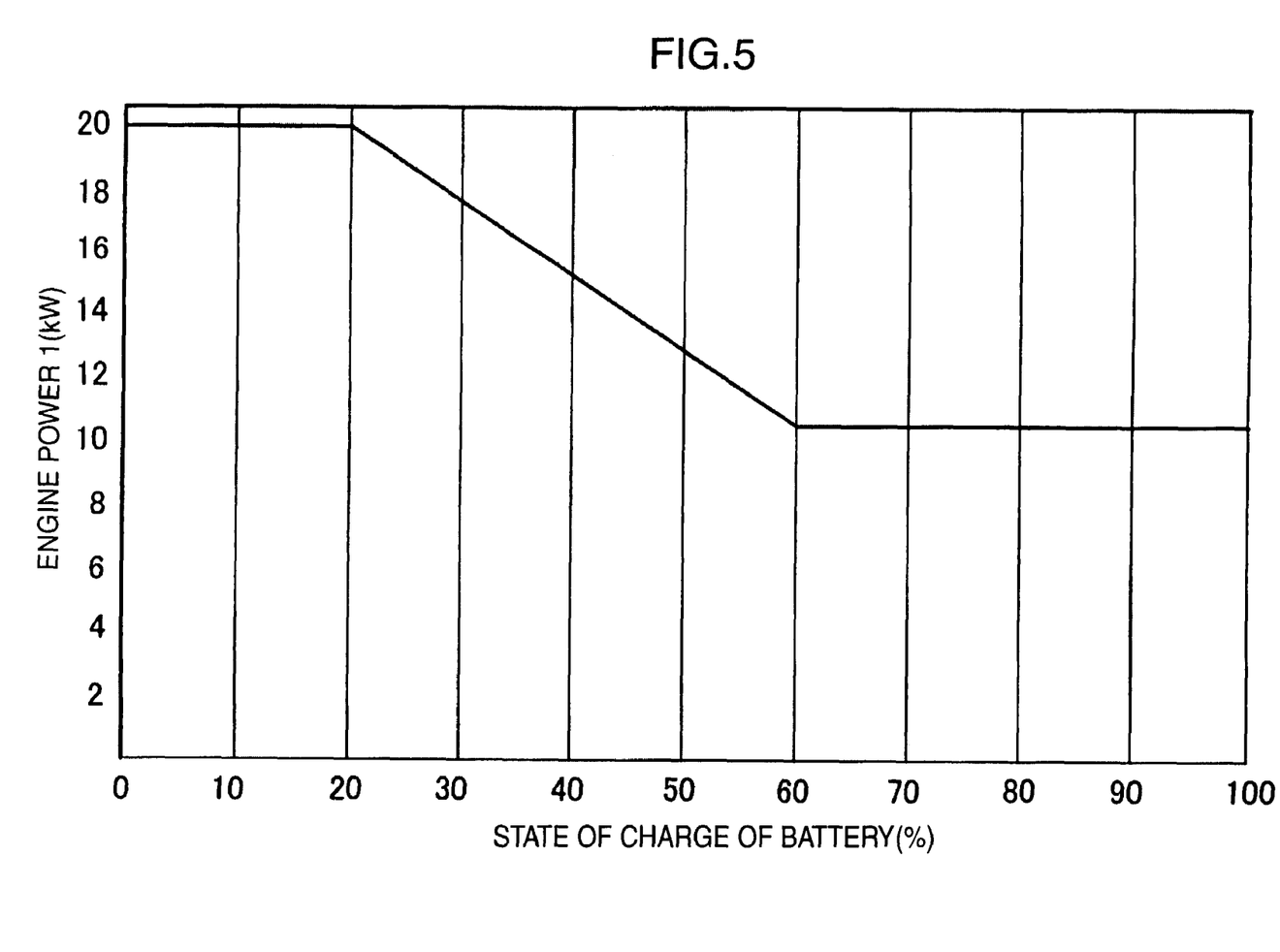
FIG. 5 is a graph showing characteristics of an engine power 1 (lower limit) with respect to a battery charge amount.
Figure 6:
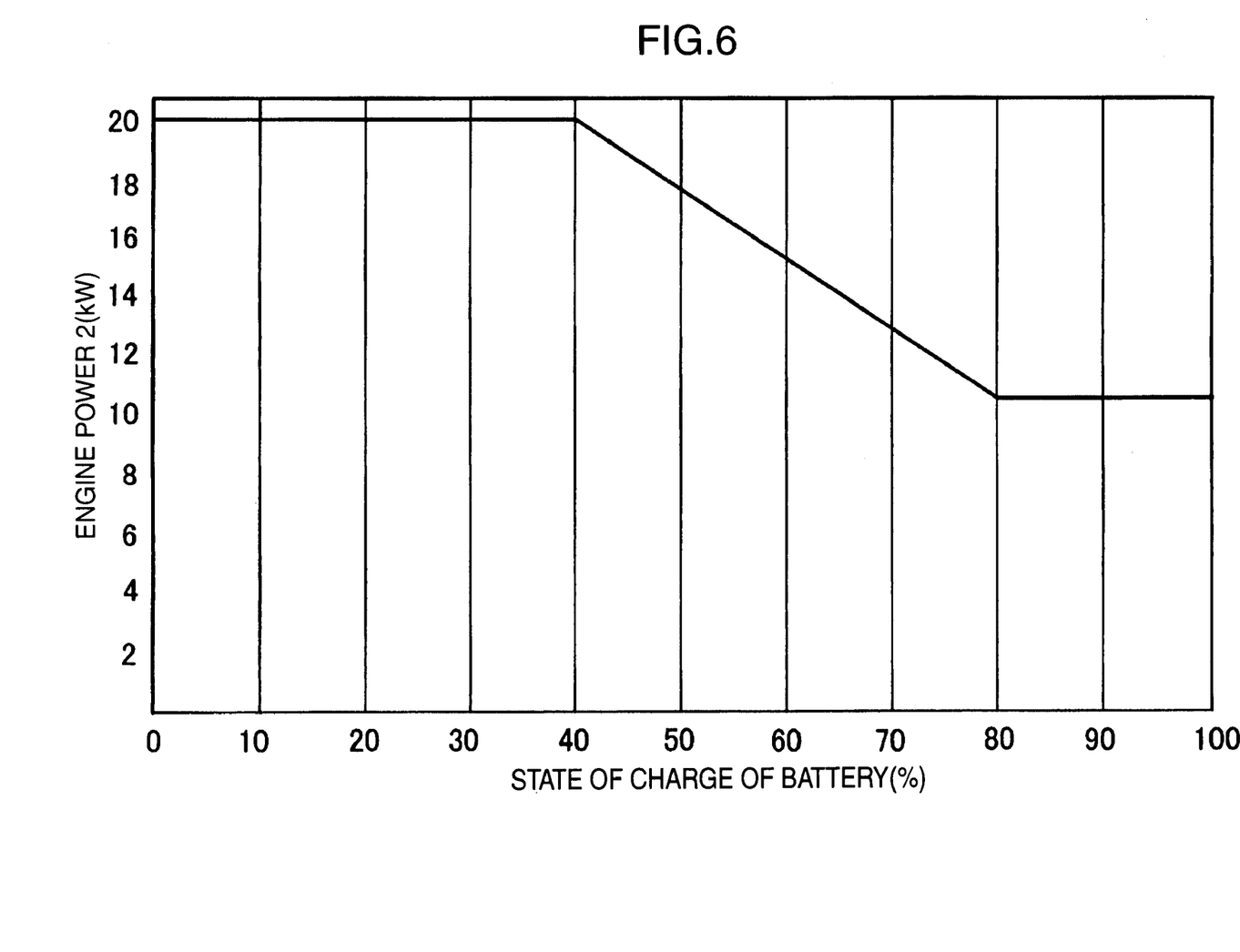
FIG. 6 is a graph showing characteristics of an engine power 2 (upper limit) with respect to a battery charge amount.

The engine power setting means 11 predefines, as shown in FIGS. 5 and 6, a relation between the battery charge amount and the engine power (the smaller the charge amount, the larger the engine power) in the form of a table. The engine power setting means 11 selects the value of the engine power corresponding to the detected battery charge amount in the table, and sets the value.

The value of the engine power to be set by the engine power setting means 11 is selected within a range covering a lower limit (battery power 1) shown in FIG. 5 and an upper limit (battery power 2) shown in FIG. 6, which is a range capable of running the engine 1 with high performance.

The power distributing means 14 determines power distribution between the engine 1 and the battery 7 based on the required actuator power, the required battery charge power, the required battery discharge power, and the engine power, which are obtained or set in the aforementioned manner.

Figure 7:
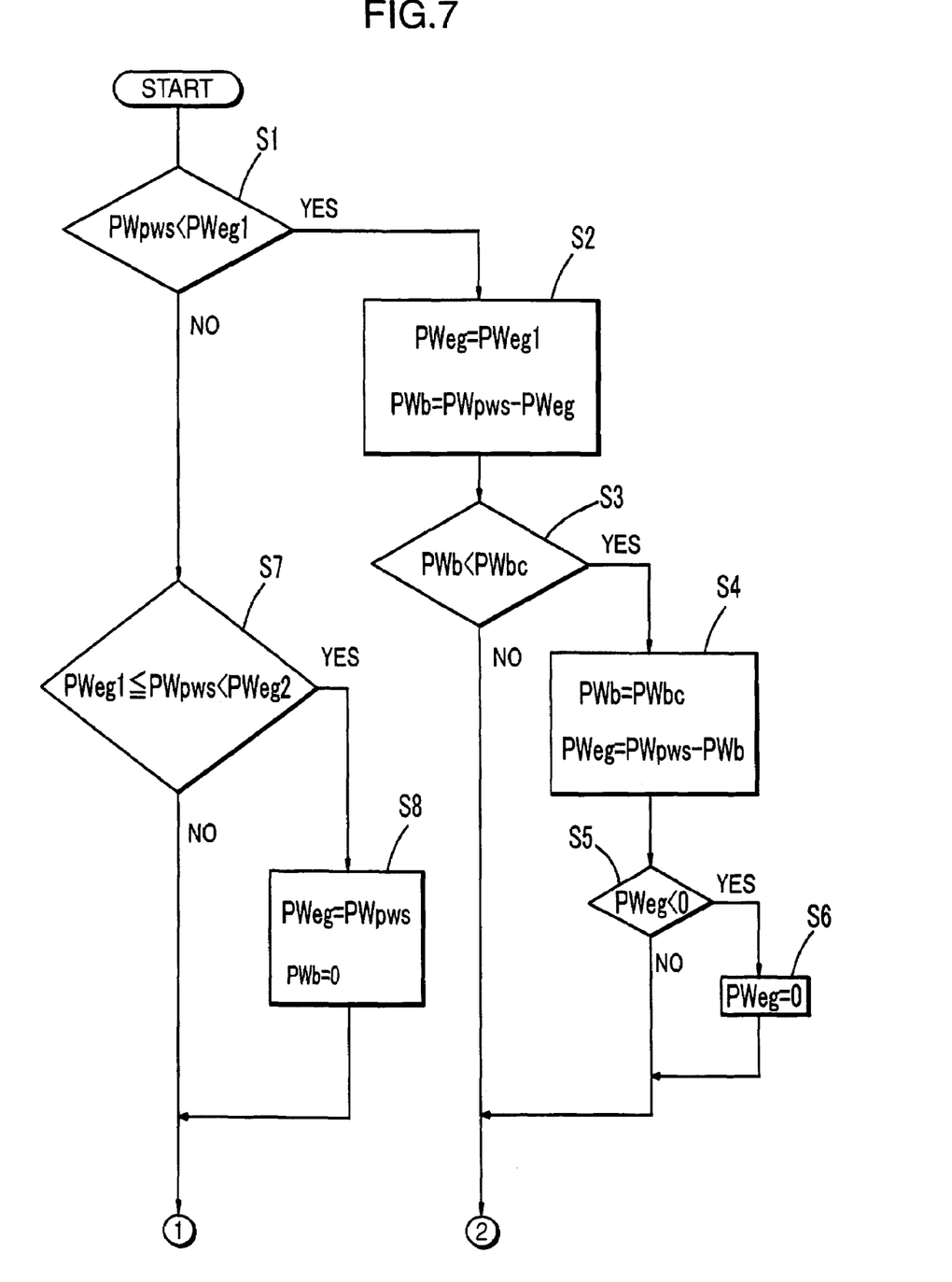
FIG. 7 is a diagram showing a power distribution flow to be conducted by power distributing means.
Figure 8:
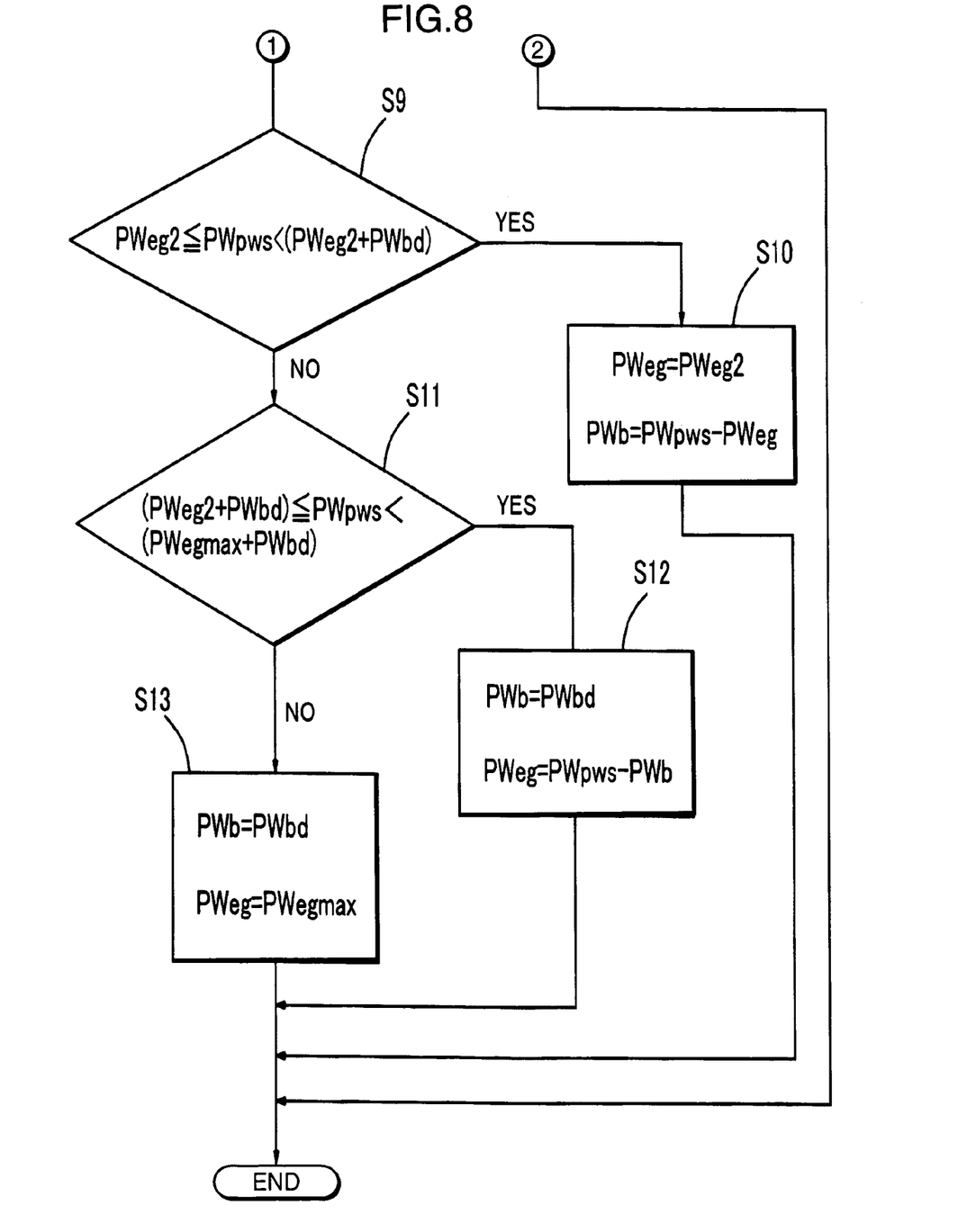
FIG. 8 is a diagram showing a latter sequence of the power distribution flow of FIG. 7.

The power distribution flow is shown in FIGS. 7 and 8.

Referring to FIGS. 7 and 8, respective symbols have the corresponding meanings as mentioned below.

PWpws: required actuator power
PWbc: required battery charge power ($\leq 0$)
PWbd: required battery discharge power ($\geq 0$)
PWeg1: engine power 1 (lower limit of engine power) ($\geq 0$)
PWeg2: engine power 2 (upper limit of engine power) ($\geq 0$)
PWegmax: maximum engine power ($\geq 0$)
PWeg: engine power
PWb: battery power where PWegmax is a constant defined by the performance of the engine.

In FIGS. 7 and 8, "+" indicates discharging of the battery 7, and "−" indicates charging thereof.

First, in Step S1 of FIG. 7, required actuator power PWpws is compared with engine power lower limit PWeg1. If required actuator power PWpws is smaller than engine power lower limit PWeg1 (YES in Step S1), it is determined that engine power PWeg=engine power lower limit PWeg1, and battery power PWb=required actuator power PWpws−engine power PWeg in Step S2.

If battery power PWb<required battery charge power PWbc, in other words, if battery power over the charging performance of the battery is set, it is determined that battery power PWb=required battery charge power PWbc, and engine power PWeg=required actuator power PWpws−battery power PWb (Steps S3 and S4).

If engine power<0, it is determined that engine power=0 (Steps S5 and S6).

If the judgment result in S1 is negative, and if engine power 1$\leq$required actuator power PWpws<engine power 2, in other words, if the required actuator power lies in the range from the engine power 1 to the engine power 2 (YES in Step S7), it is determined that engine power PWeg=required actuator power PWpws, and battery power PWb=0. In other words, the distribution is set so that all of the required actuator power is supplied by only the engine 1 (Step S8).

Referring to Step S9 in FIG. 8, if it is judged that engine power 2$\leq$required actuator power<(engine power 2+required battery discharge power), in other words, the required actuator power is judged to lie in the range from the engine power 2 to the sum of the engine power 2 and the required battery discharge power, it is determined that engine power PWeg=engine power 2 PWeg2, and battery power PWb=required actuator power PWpws−engine power PWeg in Step S10. In this case, the engine 1 supplies only the engine power 2, and the battery 7 supplies the rest of the power.

On the other hand, if it is judged that (engine power 2 PWeg2+required battery discharge power PWbd)≦required actuator power PWpws<(maximum engine power PWegmax+required battery discharge power PWbd) in Step S11, in other words, the required actuator power is judged to lie in the range from the sum of the engine power 2 and the required battery discharge power to the sum of the maximum engine power and the required battery discharge power, it is determined that battery power PWb=required battery discharge power PWbd, and engine power PWeg=required actuator power PWpws−battery power PWb in Step S12. In this case, the battery 7 supplies only the required battery discharge power, and the engine 1 supplied the rest of the power is powered by the engine 1.

Further, if (maximum engine power PWegmax+required battery discharge power PWbd)≦required actuator power PWpws (NO in Step S11), in other words, if the required actuator power exceeds the sum of the performance of the engine 1 and the performance of the battery 7, it is determined that battery power PWb=required battery discharge power PWbd, and engine power PWeg=maximum engine power Pwegmax (Step S13).

Figure 9:
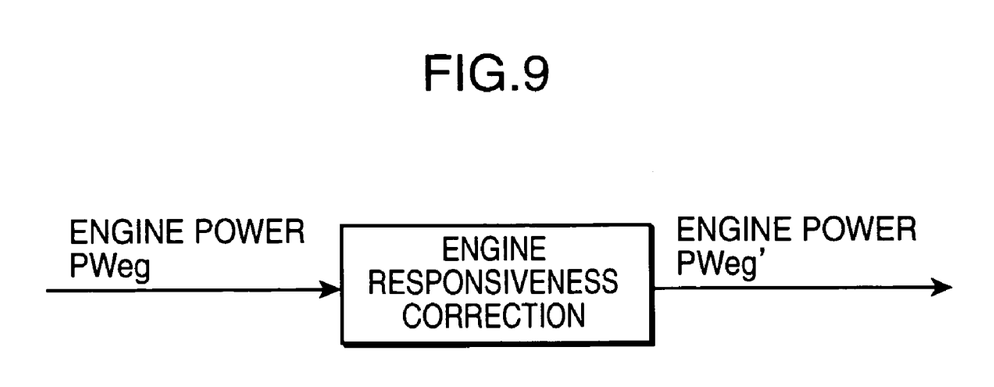
FIG. 9 is a diagram showing a response correction flow concerning an engine power.

The engine power PWeg has dynamic characteristics which cause response delay to a rapid power change. In view of this, when an amount of change in the engine power set by the engine power setting means exceeds a predetermined value, the power distribution flow executes a correction process with use of a low-pass filter or an equivalent device as shown in FIG. 9, to calculate such a corrective engine power PWeg' as brings rise of an output signal from the engine with the dynamic characteristics of the engine, for instance, increases the engine output stepwise.

Also, a corrective battery power PWb' is calculated based on the corrective engine power PWeg' by implementing the equation:

$$PWb'=PWpws-PWeg'$$

If the corrective battery power PWb' is smaller than the required battery charge power PWbc, the following equation is determined.

$$PWb'=PWbc$$

On the other hand, if the corrective battery power PWb' is larger than the required battery discharge power PWbd, the following equation is determined.

$$PWb'=PWbd$$

In this case, the engine power is re-calculated by implementing the equation:

$$PWeg'=PWpws-PWb'.$$

Further, the power of the generator-motor 4 is calculated based on the power distribution by implementing the following equations:

$$PWmg=PWpws-PWeg$$

where PWmg is a power of the generator.

$$Tqmg=PWpws/\omega mg$$

where Tqmg is a torque of the generator-motor 4 as a generator, and ωmg is an angular velocity of the generator-motor 4, which is obtained based on the rotational speed of the generator-motor 4.

The thus-obtained generator torque is sent from the power distributing means 14 to the inverter 6 in FIG. 1, as a generator torque command, based on which the generator-motor 4 is controlled to attain an output torque as requested by the command.

The charge power and the discharge power of the battery 7, and the engine power are set in accordance with the charge amount of the battery 7 by the above control. Based on the values of the powers and the required actuator power, power distribution between the engine 1 and the power machine 4 is performed. This allows for maintaining the charge amount of the battery 7 in a predetermined range, i.e. a range capable of securing effective use of the battery performance, and preventing the battery 7 from excessive charging and excessive discharging to suppress degradation of the battery 7.

Also, the setting of the charge and discharge powers in accordance with the temperature of the battery 7 enables to set the charge and discharge powers to optimum values in accordance with the battery temperature.

Further, the engine power setting means 11 defines the lower limit (PWeg1) and the upper limit (PWeg2) of the engine power, and sets the engine power in accordance with the charge amount of the battery 7 within the range covering the lower limit and the upper limit. This range can be set to a range capable of running the engine with high performance to thereby enhance the running performance of the engine 1.

Furthermore, the power distributing means 14 correctively sets the engine power so that the engine power is varied in accordance with the dynamic characteristic of the engine. This allows for prevention of decrease in the rotational speed of the engine or engine failure resulting from sharp increase of the engine load.

The above features of the embodiment enable to control the charge amount of the battery 7 while securing high running performance of the engine 1 so as to efficiently utilize the performance of a power source of a hybrid system.

Figure 10:
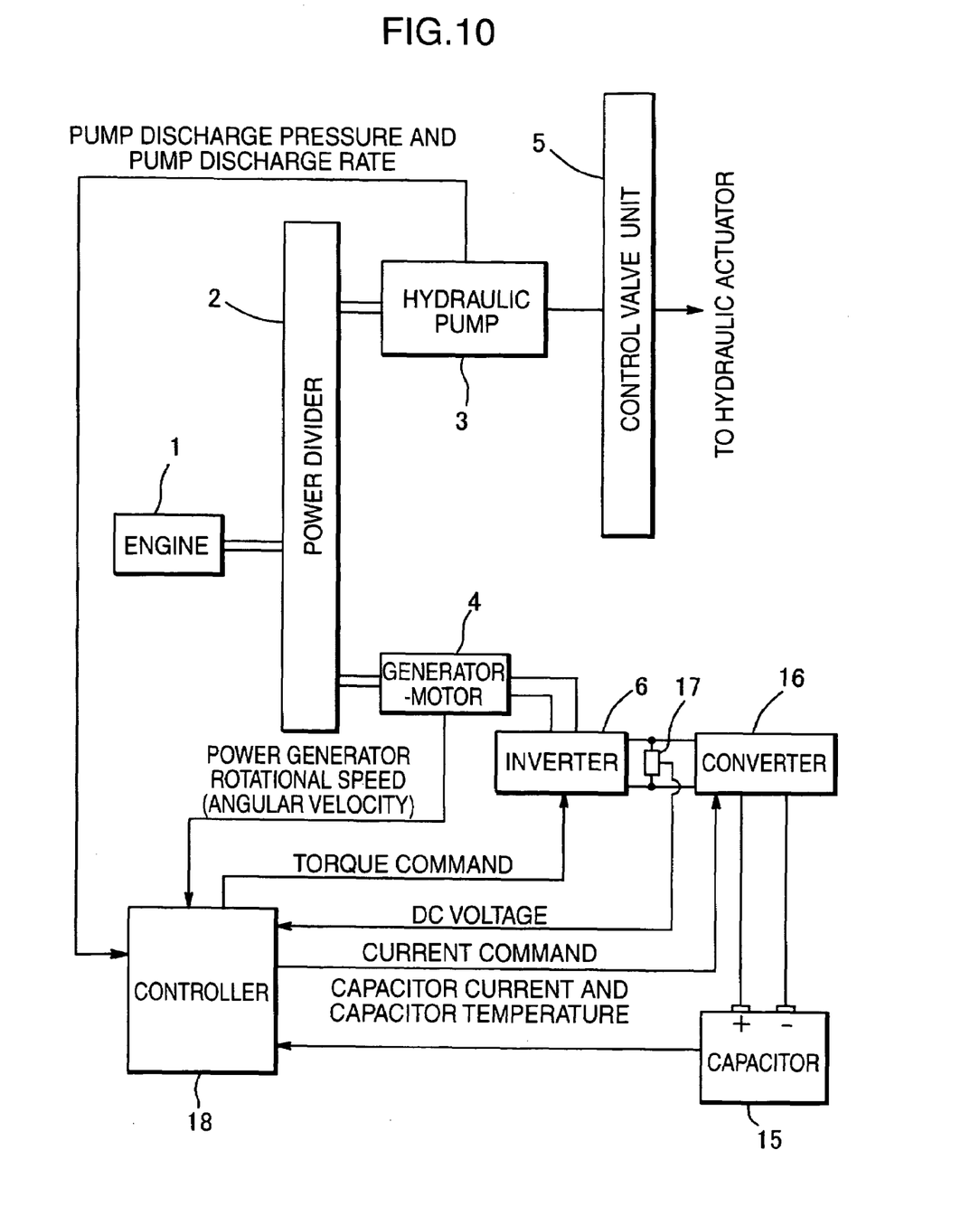
FIG. 10 is a system configuration diagram showing a second embodiment of the invention.
Figure 11:
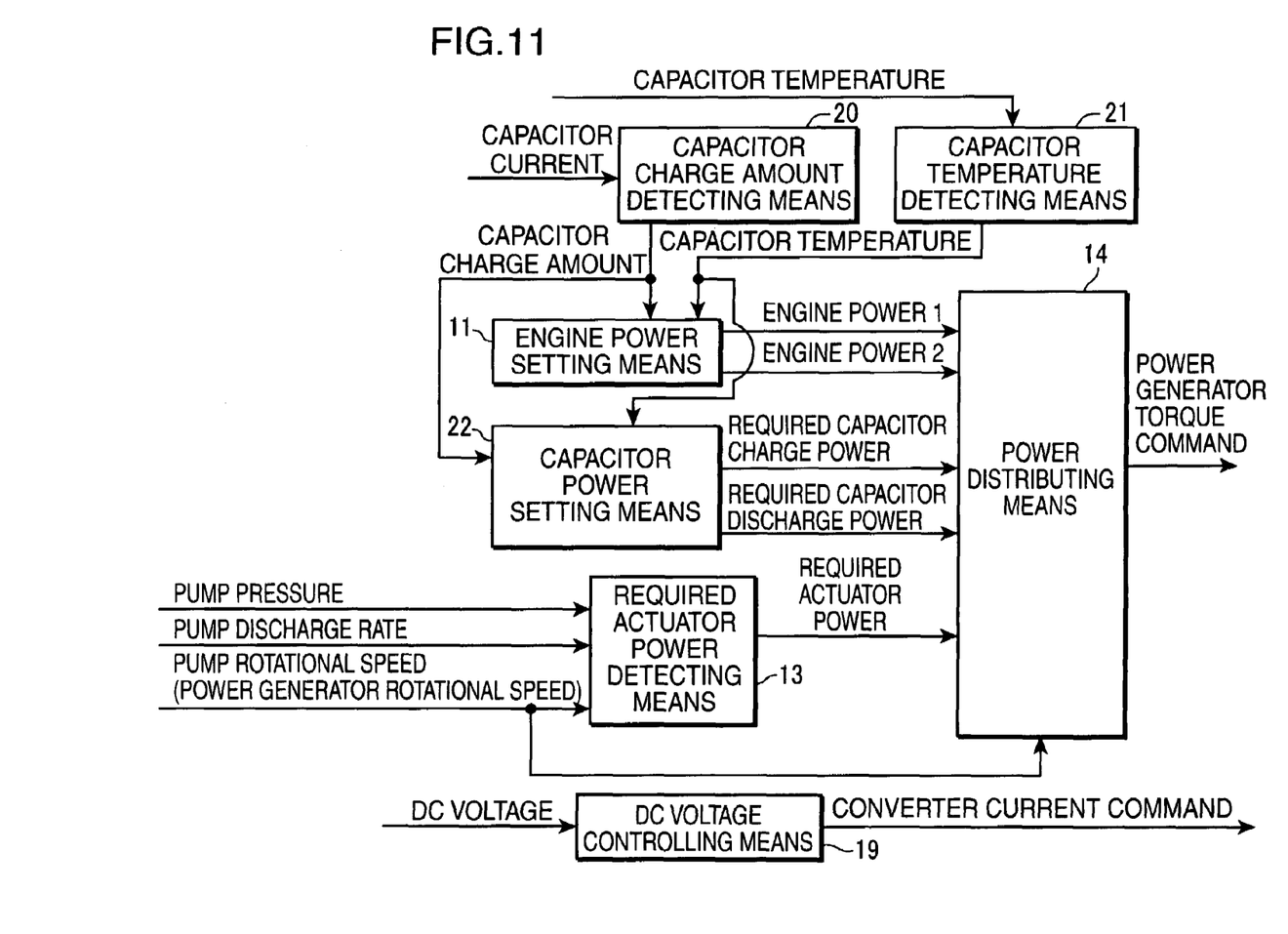
FIG. 11 is a block diagram showing a configuration of a controller.

SECOND EMBODIMENT (See FIGS. 10 and 11)

The second embodiment uses a capacitor 15 as a power storage device.

The basic system configuration of the power storage device in the second embodiment is substantially the same as that in the first embodiment except for the following.

(a) the capacitor 15 is used in place of the battery 7 in FIG. 1.

(b) a converter 16 is provided as a controlling device for the capacitor 15.

(c) a voltage sensor 17 is provided on a direct-current (DC) circuit connecting an inverter 6 and the converter 16 to detect a DC voltage.

A controller 18 in the second embodiment is different from the controller 8 in the first embodiment (FIGS. 1 and 2) in only that DC voltage controlling means 19 is added to the controller 18 as shown in FIG. 11. Capacitor charge amount detecting means 20, capacitor temperature detecting means 21, and capacitor power setting means 22 in FIG. 11 respectively correspond to the battery charge amount detecting means 9, the battery temperature detecting means 10, and the battery power setting means 12 in FIG. 2.

Operations of the second embodiment are basically the same as those of the first embodiment. Specifically, the capacitor power setting means 22 sets charge and discharge characteristics of the capacitor in a similar manner as shown in FIGS. 3 and 4 in accordance with the charge amount and the temperature of the capacitor 15. Engine power setting means 11 sets a power of an engine 1 in a similar manner as shown in FIGS. 5 and 6.

Power distributing means 14 performs power distribution between the engine 1 and the capacitor 15 according to a power distribution flow similar to the power distribution flow of FIGS. 7 and 8.

The DC voltage controlling means 19 outputs a current command to the converter 16 so that a DC voltage in the DC circuit connecting the inverter 6 and the converter 16 is set constant by feedback control of the DC voltage.

The second embodiment enables to obtain a similar effect as the first embodiment, namely, to maintain the charge amount of the capacitor 15 in a predetermined range while running the engine 1 with high performance.

Though the foregoing embodiments use the generator-motor 4 which is an integral combination of a generator and an electric motor, a generator and an electric motor may be provided individually.

Though the foregoing embodiments detect both the charge amount and the temperature of the power storage device i.e. the battery or the capacitor, only a charge amount of the power storage device may be detected. Further, detection of both a charge amount and a temperature of the power storage device, and detection of the charge amount thereof may be switched over.

As the power storage device, a combined use of the battery and the capacitor is permitted.

As mentioned above, an aspect of the invention is directed to setting a charge power and a discharge power of an electric power storage device, and a power of an engine in accordance with the charge amount of the power storage device to perform power distribution between the engine and a power machine based on the charge and discharge powers, the engine power, and a required actuator power.

In the invention of claim 2, the required actuator power is obtained based on a discharge pressure, a discharge rate, and a rotational speed of a hydraulic pump.

In the invention of claim 3, the charge power and the discharge power of the power storage device are set in such a way that a lowered temperature of the power storage device decreases the charge power and the discharge power of the power storage device. This allows for setting of the charge and discharge powers to values suitable for the temperature of the power storage device.

In the invention of claim 4, an upper limit and a lower limit of the power of the engine are defined and the power of the engine is set in a range covering the lower limit and the upper limit. This allows for setting of the engine power range in a range capable of running the engine with high performance, which enhances the running performance of the engine.

The invention of claim 5 is directed to correcting the value of the engine power so that the engine power is varied in accordance with dynamic characteristics of the engine. This allows for prevention of decrease in the rotational speed of the engine or engine failure resulting from sharp increase of the engine load.

EXPLOITATION IN INDUSTRY

The invention is useful in maintaining the charge amount of the power storage device for hybrid working machines in an adequate range.

The invention claimed is:

1. A power source device for a working machine, comprising:
   a hydraulic pump for driving a hydraulic actuator;
   a power machine functioning as a generator and an electric motor;
   an engine which serves as a common power source of the hydraulic pump and the power machine, the hydraulic pump and the power machine being connected in parallel to the engine; and
   an electric power storage device for storing a power thereof by the generator function of the power machine, the power machine being driven by a discharge power of the power storage device to perform the motor function, the power source device comprising:
   (A) required actuator power detecting means for detecting a power required by the hydraulic actuator;
   (B) charge amount detecting means for detecting a charge amount of the power storage device;
   (C) power storage device power setting means for setting a charge power and the discharge power of the power storage device in accordance with a change in the charge amount of the power storage device so as to maintain the charge amount of the power storage device in a predetermined range;
   (D) engine power setting means for setting a power of the engine in accordance with the charge amount of the power storage device;
   (E) power distributing means for determining power distribution between the engine and the power machine based on the required actuator power, the charge power and the discharge power of the power storage device set by the power storage device power setting means, and the power of the engine set by the engine power setting means; and
   (F) power machine controlling means for controlling the power of the power machine based on the power distribution determined by the power distributing means.

2. The power source device according to claim 1, wherein the required actuator power detecting means is adapted to detect the required actuator power based on a discharge pressure, a discharge rate, and a rotational speed of the hydraulic pump.

3. The power source device according to claim 1, further comprising temperature detecting means for detecting a temperature of the power storage device, wherein
   the power storage device power setting means is adapted to set the charge power and the discharge power of the power storage device to decrease the charge power and the discharge power with decrease in the temperature of the power storage device.

4. The power source device according to claim 1, wherein the engine setting means is adapted to define an upper limit and a lower limit of the power of the engine, and to set the power of the engine in a range covering the lower limit and the upper limit.

5. The power source device according to claim 1, wherein the power distributing means is adapted to correct the power of the engine set by the engine setting means so that the engine power is varied in accordance with a dynamic characteristic of the engine.

* * * * *